United States Patent
Brown et al.

[15] 3,699,904
[45] Oct. 24, 1972

[54] CREMATOR

[72] Inventors: Charles W. Brown, 1104 North Snodgrass; Marion D. Bliler, North Webster Street; Jerry F. Breuel, Langleville Road, all of Taylorville, Ill. 62568

[22] Filed: Sept. 1, 1970

[21] Appl. No.: 68,614

[52] U.S. Cl. .................................110/8 C, 110/18 C
[51] Int. Cl. ................................................F23g 5/12
[58] Field of Search ..............110/3, 8, 8 C, 18, 18 C

[56] References Cited

UNITED STATES PATENTS

| | | | |
|---|---|---|---|
| 2,847,951 | 8/1958 | Triggs | 110/8 |
| 2,044,085 | 6/1936 | Laghetto | 110/18 |
| 2,726,609 | 12/1955 | Martin | 110/8 |
| 2,242,653 | 5/1941 | Maxwell | 110/8 |
| 3,177,827 | 4/1965 | Melvin | 110/3 X |
| 3,176,634 | 4/1965 | Martin | 110/3 |

Primary Examiner—Kenneth W. Sprague
Attorney—Walter T. Morey and John F. Dunn

[57] ABSTRACT

This invention is an apparatus of simple and inexpensive design for cremation of animal carcasses using a single burner to cremate efficiently in the absence of objectionable smoke and odor levels.

4 Claims, 2 Drawing Figures

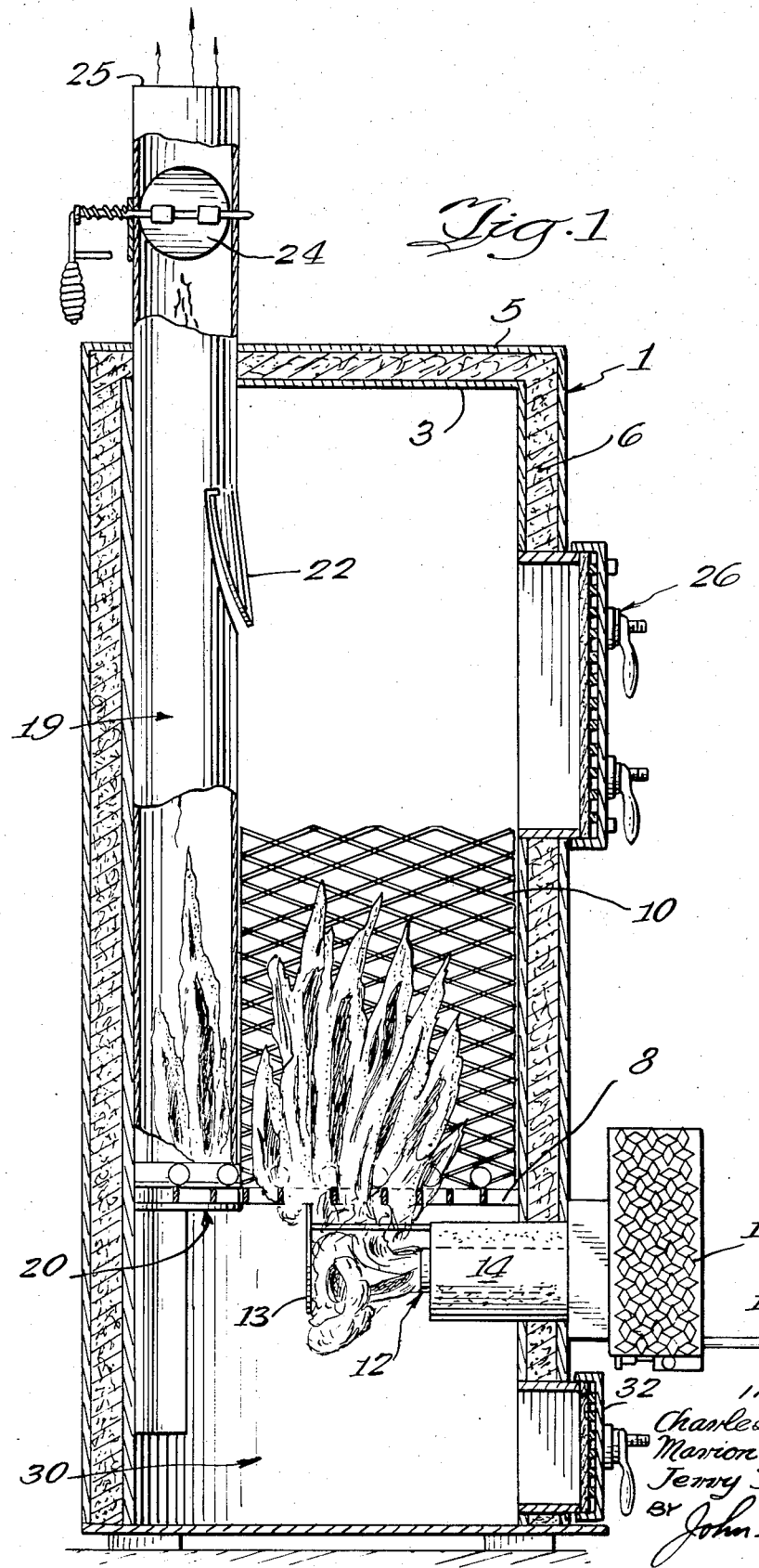

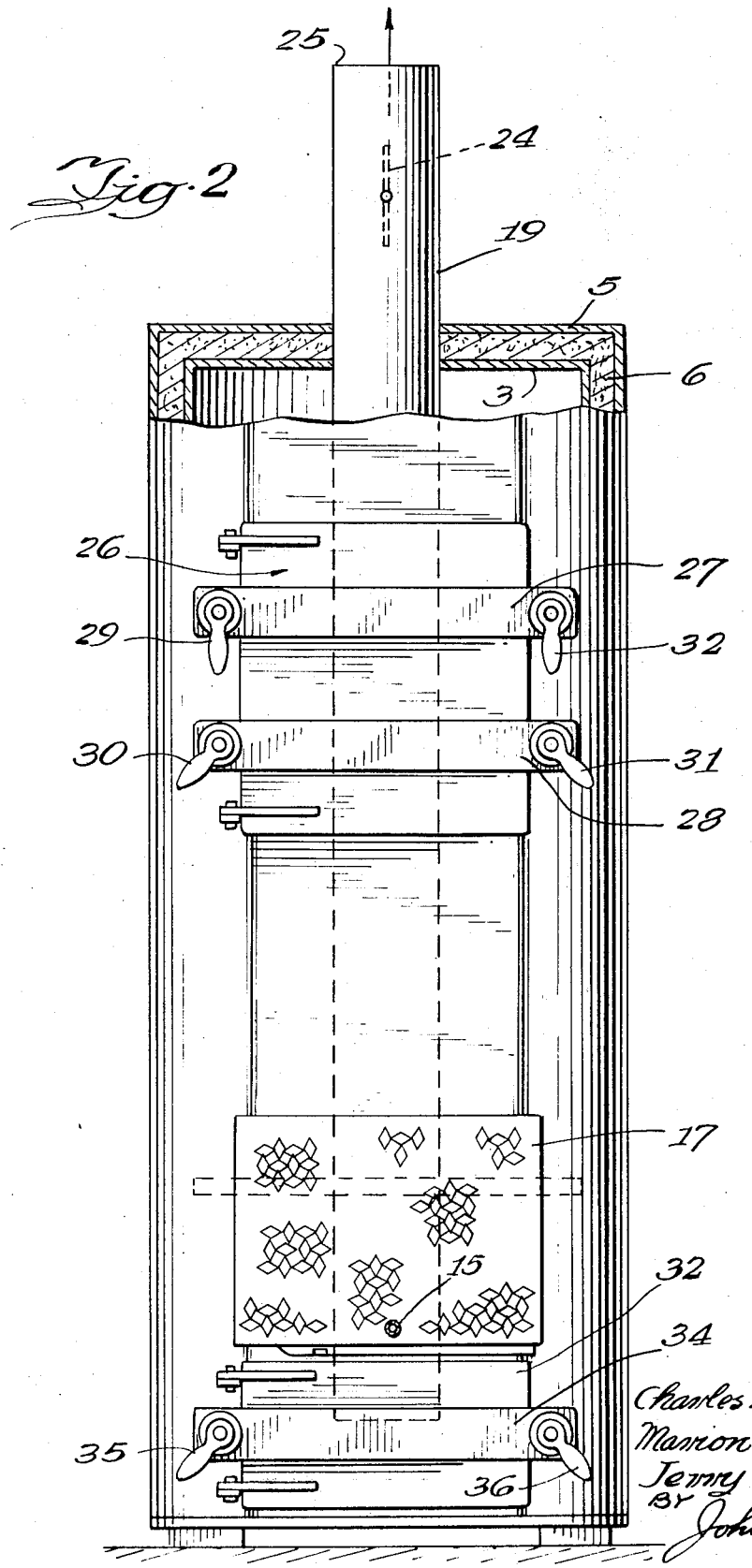

CREMATOR

This invention relates to an apparatus for cremation of animal carcasses. More particularly this invention relates to an efficient apparatus of inexpensive design which is advantageous to cremate animal carcasses. Still more particularly this invention relates to an apparatus for cremation of animal carcasses with low fly-ash deposit levels and nonobjectionable smoke and odor emission levels. Still more particularly this invention relates to an apparatus for cremation of animal carcasses which can be readily installed and advantageously maintained in operation.

In the past in many applications, animal carcasses have been disposed of by burial. This generally employed expedient, however, is being employed on a less and less frequent basis with each passing year for the reason that increased labor costs have become a determining economic factor resulting in excessively high burial costs, especially during the winter months in areas of the country where cold weather makes excavation extremely difficult. The trend, therefore, now is toward disposal by cremation and away from disposal by burial.

Whereas substantial elimination of smoke and odor is desirable in both domestic and commercial incinerators, smoke and odor minimization is imperative in the process of cremation of animal carcasses for the reason that the odor thereof is generally considered repulsive. Furthermore in these times of concern for ecology and reduction or elimination of air pollution, reduction of smoke and odor levels is becoming more and more important. It is important, therefore that cremation apparatus burn carcasses in a manner that does not produce objectionable smoke or odor.

Cremation devices presently known and available are capable of burning animal carcasses to ash. These devices, however, achieve combustion of carcasses, with more or less resultant reduction of smoke and odor levels by intricate, elaborate and highly inefficient combinations of high temperatures, slow burn rates and high fuel consumption. For example, with devices presently available on the market it may take longer than ten hours to burn two hundred pounds of carcass.

Devices presently available on the market are disadvantageous because of high initial cost which is the result of complex construction and design, and also because of impractical fuel requirements and slow burning rates. Furthermore known devices involve frequent and complicated maintenance problems.

An object of this invention is an apparatus for the cremation of animal carcasses. Another object of this invention is an improved apparatus of simple and inexpensive design for efficient cremation of animal carcasses to reduce furl consumption and lower smoke and odor emission levels to within nonobjectionable limits. A further object of this invention is inexpensive cremation apparatus to meet veterinarian needs for low cost devices to burn animal and poultry carcasses under economically advantageous conditions. Still a further object of this invention is an apparatus employing a single burner for both primary combustion and afterburning of primary combustion products.

FIG. 1 illustrates, in partial cross-section, an embodiment of the invention for efficient cremation of animal carcasses.

FIG. 2 illustrates, in elevation, the embodiment of FIG. 1.

Broadly the present invention is an apparatus for cremation of animal carcasses, said apparatus including a combustion chamber, a burner positioned inside said combustion chamber, means to supply oxygen to the chamber for combustion, and a flue adapted and positioned to receive combustion products adjacent to the burner and afterburn the combustion products prior to their discharge to the atmosphere. Accordingly when a carcass, or parts of carcasses, are charged to the combustion chamber, together with air and fuel, combustion takes place upon ignition of the burner and primary gaseous combustion products are released to the atmosphere only after flowing into the flue adjacent the burner to facilitate secondary or complete combustion and effectuate afterburning. Thus discharge to the atmosphere through the flue outlet or stack is nonobjectionable.

In a preferred embodiment of the invention a container is positioned inside the combustion chamber with the periphery of the container spaced inside and apart from the walls of the combustion chamber. The container has a series of openings, which may suitably be the result of mesh construction of said container or perforations therein to permit combustion about the periphery of the container thereof with the result that when an animal carcass, or parts of carcasses, are charged into the container, combustion takes place not only in the area immediately adjacent to the burner but also about the periphery of the container with the advantageous result of a faster, more complete, efficient and even-burning process.

Thus it will be seen that the apparatus of the present invention is advantageous in many aspects. It can be used to greatly reduce the time required to cremate a given carcass, and conversely, of course, it will facilitate disposal of larger quantities of material in a given period of time. For example, 200 pounds of carcass can be efficiently burned in about 6 hours with applicants' apparatus. A single burner is employed in contrast with known devices requiring multiple burner operations and separate, duplicate afterburner facilities. The apparatus of the present invention is further advantageous because of its simple and inexpensive design and low operating costs construction. Thus applicants have invented an apparatus which both improves the efficiency of cremation of animal carcasses and at the same time reduces smoke and odor to nonobjectionable levels.

Referring now to the drawings for purposes of illustration, the embodiment of FIG. 1 shows combustion chamber 1 having inner wall 3 fabricated of a commercially available cold rolled steel and outer wall 5 constructed of eighteen gauge black sheet iron. Walls 3 and 5 may be constructed of other suitable adequate fire and warp resistant material. Insulation consisting of ceramic fiber felt formed in place or a combination of known ceramic insulations is provided in the space 6 between walls 3 and 5. Various other types of commercially available insulating materials may also be employed. In the embodiment illustrated combustion chamber 1 is elongated and generally cylindrical in shape. Other configurations of said chamber suitable to accomplish the intended purpose may be employed. Warp resistant, removable, steel grate 8 is located within the lower portion of chamber 1 and furnishes primary support for materials charged to said chamber for combustion.

Burner 12 is positioned centrally in the lower portion of chamber 1 and fires up through grate 8 from below by firing against baffle plate 13. Burner 12 suitably is a commercially available power burner providing approximately 100,000 to 125,000 B.t.u's per hour. It should be understood that, within the scope of the invention, burner 12 may comprise other suitable burner means and may provide other suitable amounts of heat energy. Burner 12 must be capable of raising the temperature within chamber 1 sufficiently to assure the desired combustion. Burner 12 is insulated by means of burner tube insulation 14. Oxygen is admitted to chamber 1 by means of inlet 15 on top of burner control 17. Fuel and air are admixed and controlled by burner control 17 which, suitably, is of a type well known in the art.

Container 10 rests on top of grate 8 and is spaced apart from inside walls 3 of chamber 1. As illustrated container 10 is a mesh expanded steel charging chamber, and is designed to admit air and flame to charged materials along the sides of the container as well as up through grate 8. This provides improved delivery of oxygen and flame from the burner to the various side portions of container 10 within the combustion chamber 1. Therefore air and flame sponsor combustion along the sides as well as at the bottom of container 10. Flue 19 is positioned in chamber 1 with inlet 20 adjacent burner 12 at the underside of grate 8. Flue 19 includes pressure relief port 22, damper 24 for manual adjustment to control air and smoke emission from flue outlet 25. Animal carcasses to be burned are charged to container 10 through the large insulated charging door 26 which is secured when the apparatus is in operation by means of steel bars 27 and 28 and lock handles 29, 30, 31 and 32. Final combustion products fall through grate 8 into ash receptical area 30. Ashes are removed through ash removal door 32 which also is locked during operation by means of lock bar 34 and lock handles 35 and 36.

In operation an animal carcass or portions of animal carcasses are charged through door 26 into container 10. Air and fuel are ignited at burner 12 to initiate combustion. Because container 10 is laterally spaced apart from inside chamber wall 3 and because container 10 has a plurality or a series of openings therein improved delivery of air and flame from burner 12 to the periphery of container 10 is effected with resultant rapid and efficient combustion. Combustion products rise into the upper portion of burner chamber 1 and are then forced to flow back down through the burner flame and through grate 8 in order to gain entry into flue inlet 20. Because the inlet of flue 19 is positioned adjacent to burner 12 materials which are only partially burned are further consumed as they pass back through the primary combustion flame and into flue 19 where final combustion or afterburning takes place. The degree to which afterburning is required is controlled by means of damper 24. By this simplified means of afterburning smoke and odor are efficiently controlled at desirable levels.

Thus it will be apparent that the apparatus described above is not limited to the structure and the exact methods recited but shall also include other structures and combinations falling within the broad scope and spirit of the invention, the detailed description, and the claims which follow.

What is claimed is:

1. An apparatus for burning combustible materials comprising: a combustion chamber including a grate means therein; a burner means positioned within said chamber below said grate to direct flame and heat therefrom upwardly through said grate; means to supply oxygen to said chamber; and a flue having its inlet disposed adjacent said grate and positioned in spaced-apart relationship to said burner means to receive and afterburn combustion products of said combustion chamber.

2. An apparatus for burning combustible materials comprising: a combustion chamber including a grate means therein; a container positioned inside of and spaced apart from the walls of said combustion chamber, said container having a series of openings therein to permit combustion about the periphery thereof; a burner means positioned within said chamber below said grate to direct flame and heat therefrom upwardly through said grate; means to supply oxygen to said chamber; and a flue having its inlet disposed adjacent said grate and positioned in spaced-apart relationship to said burner means to receive and afterburn combustion products of said combustion chamber.

3. The apparatus of claim 2 including pressure relief means in said flue.

4. The apparatus of claim 2 including means to regulate flue effluent.

* * * * *